United States Patent
Weakly et al.

[11] Patent Number: 6,135,171
[45] Date of Patent: Oct. 24, 2000

[54] PASSIVE ENCLOSURE DUST CONTROL SYSTEM

[76] Inventors: L. Alan Weakly, 1101 Jason Ct.; Delmer Leroy Shelstad, 420 Walnut, both of Gillette, Wyo. 82718

[21] Appl. No.: 09/272,179

[22] Filed: Mar. 18, 1999

[51] Int. Cl.[7] .................................................. B65G 21/00
[52] U.S. Cl. ...................... 141/286; 198/560; 198/860.1; 198/860.5; 198/956
[58] Field of Search .................................... 141/129, 286; 198/560, 860.1, 860.3, 860.5, 956

[56] References Cited

U.S. PATENT DOCUMENTS

| | | | |
|---|---|---|---|
| 1,803,689 | 5/1931 | Berndt | 198/560 |
| 3,057,454 | 10/1962 | Frasch et al. | 198/560 |
| 3,305,128 | 2/1967 | Dearsley | 198/560 |
| 3,532,099 | 10/1970 | Fuchu | 198/560 |
| 3,583,582 | 6/1971 | Ostarello | 198/560 |
| 3,731,397 | 5/1973 | Kayatz et al. | 198/560 |
| 4,678,076 | 7/1987 | Nenakhov et al. | 198/956 |
| 5,494,150 | 2/1996 | Mcdonell et al. | 198/956 |
| 5,553,968 | 9/1996 | Campbell | 198/560 |
| 6,000,533 | 12/1999 | Bradbury | 198/860.5 |

*Primary Examiner*—J. Casimer Jacyna
*Attorney, Agent, or Firm*—Blackwell Sanders Peper Martin

[57] ABSTRACT

A material handling transfer system which utilizes passive dust control methods for containing and controlling fugitive dust emissions generated during a transfer operation. The present system includes an enclosure containment structure which houses a specially designed transfer chute for vectoring a stream of moving material from a first elevated transfer location to a second lower transfer location, the chute being constructed to reduce fugitive dust emissions at the second transfer location, an adjustable deflector mechanism for containing and funneling the bulk material onto the transfer chute structure, and a stilling zone positioned downstream from the second transfer location for impeding the propagation of any fugitive dust emissions through the exit area of the enclosure structure. The present enclosure structure is specifically designed to allow for recirculation of the induced air flow generated within the enclosure structure to both relieve any pressure build up formed therewithin, particularly, in the vicinity of the second transfer location, and to facilitate the agglomeration of dust particles within the enclosure. The present system is adaptable for use in a wide variety of different material handling transfer applications including applications which involve a belt-to-belt transfer operation, a belt-to-bin transfer operation, a bin-to-belt transfer operation, a crusher-to-belt transfer operation, and both in-line and angular transfer operations. The present system therefore provides a more cost effective and less complicated system for achieving a safe work environment in areas where fugitive dust emissions must be controlled and contained.

29 Claims, 7 Drawing Sheets

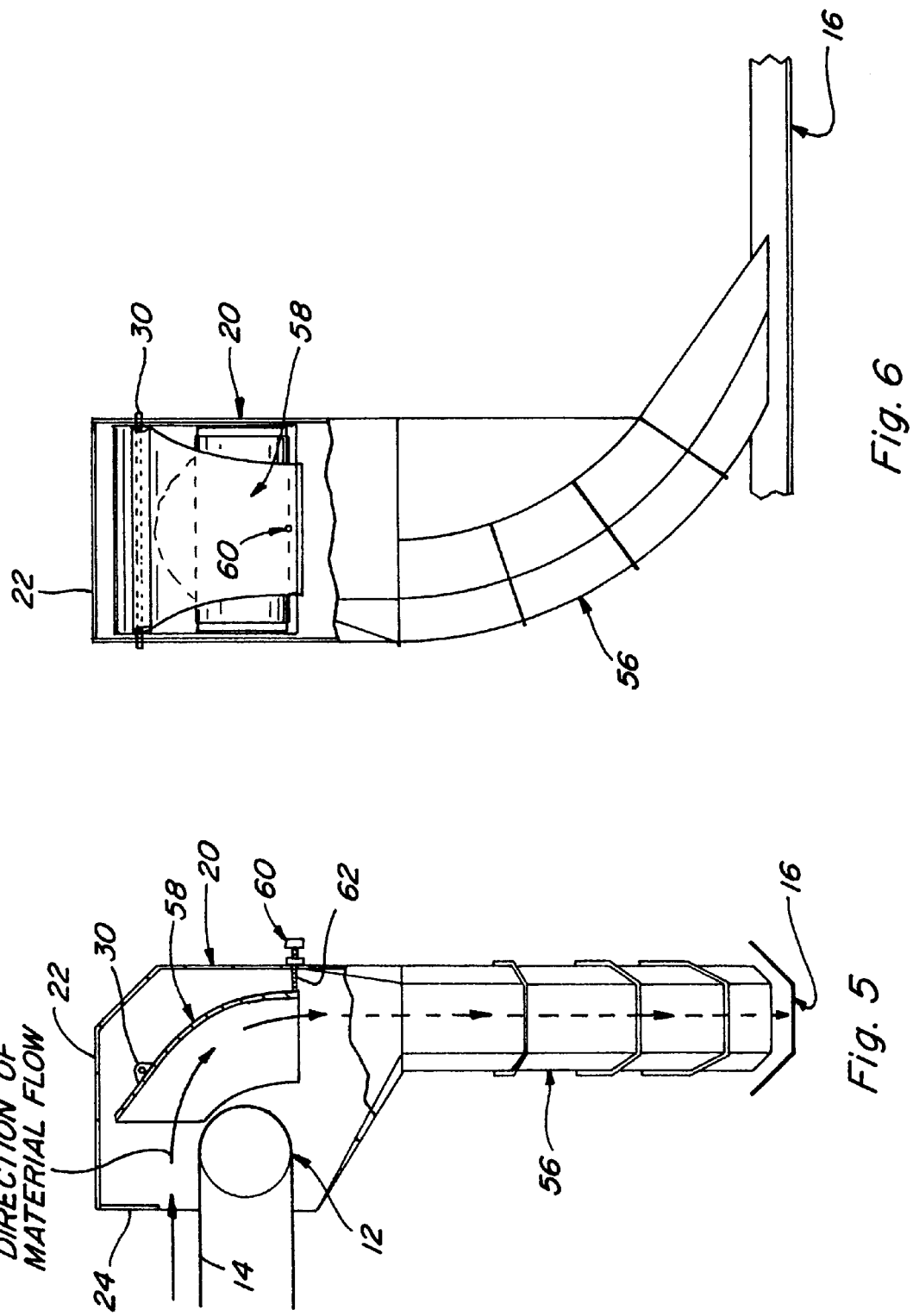

PASSIVE ENCLOSURE DUST CONTROL SYSTEM

TECHNICAL FIELD

This invention relates generally to material handling transfer systems for controlling dust generation in bulk material handling transfer operations and, more particularly, to a passive enclosure dust control system which is specially designed to both reduce dust generation at the material transfer point and to reduce or mitigate induced air flow pressures and air velocity generated within the system. The present invention also includes a dust stilling area in the enclosure system to further reduce air velocity within the enclosure. This combination of features allows the present system to effectively control fugitive and respirable dust emissions in a material handling transfer operation without the use of active dust collection control techniques.

BACKGROUND ART

Fugitive dust is generally defined as dust particles having an equivalent particle size or diameter in the range of 10 microns or greater whereas respirable dust is generally defined as dust particles having an equivalent particle size or diameter in the range of 10 microns or less. Fugitive dust particles are generally visible whereas respirable dust particles are generally not visible but stay suspended in the air. Both fugitive and respirable dust particles not only present a potential health hazard to personnel in the area but, depending upon the particular type of material involved, large concentrations of fugitive dust emissions can likewise be highly explosive. In material handling operations, dust more frequently becomes airborne at a processing point or at a conveyor belt transfer point, particularly, when large volumes of dusty material are involved and a change in elevation occurs at the transfer point.

One of the primary mechanisms of fugitive dust generation in bulk material handling operations is by dispersion of the dust in turbulent air induced to flow with falling or projected material streams. A stream of free-falling, or even sliding, bulk material induces in its wake a substantial flow of air as a result of frictional drag that the individual particles of the stream impose upon the surrounding air. At the end of its fall, when the material impacts, for example, a conveyor belt, a great deal of dust is generated at the impact location and the air becomes saturated with this dust. This dust laden air is then forced to escape under pressure. This scenario typically describes the primary method by which dust is generated in a typical conveyor-to-conveyor transfer operation.

Induced air flow is derived from the frictional drag imposed by air on the falling or projected material particles. While the particulate stream of material is falling through the air, frictional drag is tending to accelerate the surrounding air to the velocity of the falling stream. In other words, power or energy is being transferred from the falling solid material to the surrounding air. However, only a portion of this potential energy or power developed by the falling solid material stream is available to produce net air movement in the direction of the fall. The remaining balance of this potential energy goes to creating air turbulence. Also, many of the material particles are not sufficiently separated or spaced from adjacent particles to be subject to frictional drag, that is, some particles fall in the wake of other particles, particularly, in a compact stream that falls only a short distance and does not touch the associated chute or other containment walls. As a result, this induced air will flow from ingress around the discharging conveyor belt system to the belt loading zone of the receiving conveyor belt system and, if not allowed to be exhausted to some type of collection system, this induced air flow will pressurize the loading zone containment area causing entrained dust to blow out of leakage areas in the enclosure. This is true because, in a conventionally designed dust control transfer containment system commonly employed in the industry, the induced air flow typically has no other flow path in which to dissipate.

Still further, in the known material handling transfer systems, the material being transferred from a first elevated conveyor belt system to a second lower conveyor belt system is typically allowed to free-fall and directly impact the second conveyor belt system. This direct impact of the falling material stream onto the conveyor belt system provided in the loading zone of the transfer point typically produces a "trampoline" or pumping action of the conveyor belt due to the impact of the falling material, which pumping action provides another mechanism for fugitive dust generation in that it pumps more dust and particulate back into the enclosure system as well as out through the seal skirting surrounding such containment system. Where the material transfer is totally enclosed, such as is typically the case in a conveyor-to-conveyor transfer system, the induced air component usually predominates and must be exhausted in some fashion in order to control dust emissions.

Using the coal industry as an example, there are several methods commonly employed for controlling coal dust that becomes airborne in coal handling and processing facilities. These dust control systems must accomplish two primary goals, namely, (1) maintain a non-hazardous work environment for both personnel and equipment, and (2) minimize the emissions of dust into the ambient atmosphere. These goals must be met to the satisfaction of the operator as well as to the satisfaction of both state and federal regulatory agencies which deal with environmental and occupational health issues. Such known dust control systems typically include suppression type systems such as water spray systems as well as foam and water misting systems, dust filter systems, enclosure systems, and a baghouse and fan system to name a few.

All of the known dust control systems commonly employed for controlling fugitive dust emissions suffer from certain limitations and disadvantages depending upon the particular material application involved. For example, known water spray systems typically depend upon the application of a large quantity of water that is sometimes mixed with a wetting or binding agent. The objective of this system is to coat the surface of the coal or other material product so that finer coal particles adhere to the larger particles to prevent them from becoming airborne. The use of large quantities of water is deleterious to product quality in that it increases the moisture content and decreases the as-shipped calorific value. Furthermore, in a coal mining operation, water should not be applied down stream of the coal-quality sampling point, since the sample would not be representative of the product being shipped. Also, importantly, these types of dust control systems are often subject to freezing and becoming disabled when operating in freezing temperatures since water forms ice coatings on the equipment such as the conveyor belts, idlers, drive pulleys and other components resulting in production interruptions and damage.

Known foam and water misting systems generally use much less water as compared to water spray systems, thus avoiding significant impact to the product quality. These systems are typically designed to attack the dust directly. The agent is applied within an enclosure where the dust is contacted, coated and agglomerated together causing such particles to fall out of the air back onto the belt conveyor system. Experience has shown that in high capacity coal handling systems, mists and foams do not sufficiently coat and contact the dust particles so as to result in an efficient dust removal system. In freezing temperatures, these systems also tend to freeze and become disabled. Even small amounts of water in extreme cold are hazardous to many different types of material handling equipment, particularly coal handling equipment.

Known dust filter systems typically use a fan and filter housing directly attached to the hood structure that surrounds a processing or transfer point to trap and immediately return dust to the product stream. The control theory employed in these systems is similar to that used in baghouse systems, except that the dust is not transported to a remotely located baghouse filter system. Dust filter systems are inexpensive but are only effective for very small material handling capacities.

Still further, known enclosure systems simply keep the airborne dust from escaping into the ambient environment thereby allowing the dust to accumulate inside the enclosure. Such systems can be used only where personnel and hazardous equipment are not present. Examples of such areas in a coal handling system include storage silos, storage barns and stilling sheds over truck dumping stations.

The known dust control and collection system most frequently used on large scale coal handling systems is a baghouse and fan system. This system actively ventilates induced air flow from a material handling transfer point and transports such dust to a remotely located baghouse filter system where such dust is filtered back to the coal stream. This type of system is expensive to operate and is particularly prone to malfunction, especially in freezing weather due to the high moisture content of the subbitumious coal. Baghouse systems would commonly be specified for most process and transfer points where a structural enclosure is not acceptable.

It is therefore desirable to provide a material handling dust control transfer system which effectively exhausts the induced air component associated with a bulk material handling operation and which effectively controls fugitive dust emissions during such transfer operations. It is also desirable to provide a system which requires minimum maintenance, no power consumption, no moving parts, no water, mist or other suppression agents, and which is relatively inexpensive to install and operate as compared to other known dust emission control systems. Accordingly, the present invention is directed to overcoming one or more of the problems as set forth above.

SUMMARY OF THE INVENTION

In accordance with the teachings of the present invention, a substantially dustless passive enclosure control system is disclosed wherein an enclosure containment structure, a specially designed deflector means, a specially designed transfer chute, and a stilling zone are all coupled and married together in a particular manner such that the fugitive dust emissions generated when a bulk material, such as coal, is transferred from one handling location to another handling location is substantially contained and controlled without using active dust collection means such as a wide variety of water suppression systems as well as a wide variety of fan and filter systems. In this regard, the present system is particularly adaptable for use in coal mining operations where coal is being transferred from a first conveyor belt system to a second conveyor belt system, the first conveyor system being located at a higher elevation as compared to the second conveyor system. Still further, although the present transfer containment system will be described with reference to a belt-to-belt transfer operation, it is likewise equally adaptable for use with a belt-to-bin transfer application, a bin-to-belt transfer application, and a crusher-to-belt transfer application.

The present transfer system includes an enclosure which completely encases the entire transfer operation including the termination point of the first conveyor belt system as well as the impact zone associated with the second conveyor belt system when the bulk material is being transferred from the first conveyor system to the second conveyor system. Typically, these conveyor systems are vertically separated from each other and fugitive dust is generated by the stream of falling material from one conveyor system to another as previously explained. A specially designed chute structure connecting the termination end of the first elevated conveyor belt system with the second lower conveyor belt system forms a part of the present system, the transfer chute structure being specifically designed so as to eliminate the direct impact of the falling material stream onto the second belt system. In this regard, the present transfer chute is designed to maximize the material flow while moving down the chute and to more substantially align the trajectory of the moving material at the end of the chute with the direction of movement and speed of the second conveyor belt system. This arrangement substantially eliminates the "trampoline" action that pumps dust into the air when the stream of material suddenly impacts the second conveyor belt system and, in essence, lays the flowing stream of material onto the second conveyor belt in substantially the same direction and at substantially the same speed as belt movement. This substantially eliminates dust generation due to the impact of free-falling material directly onto the second conveyor belt system, which direct impact is typically at a large acute angle to the direction of belt movement of the second conveyor system.

In order to further control movement of the bulk material from the first conveyor system to the second conveyor system and to substantially eliminate any free-fall of the bulk material between such conveyor systems, the present invention likewise includes adjustable deflector means located in the vicinity of the termination point of the first conveyor system for aiding in funneling the bulk material onto the present transfer chute structure. The object here is to contain the stream of moving and falling material as it comes off of the first conveyor belt system and to position such material onto the chute structure as quickly and as smoothly as possible so as to avoid a stream of free-falling material and the dust generated when such stream of free-falling material directly impacts either the chute structure or the second conveyor belt system located therebelow. Depending upon the speed and trajectory of the material coming off of the first conveyor belt system, the present deflector means can be adjusted to most efficiently capture and funnel such material into and onto the chute structure. If no deflector means were utilized, the trajectory of the material coming off of the first conveyor belt system would allow at least a portion of such material to spread out, free-fall and accelerate thereby increasing the induced air component associated with the falling material particles. The present deflector means therefore minimizes induced air by containing the material stream in a much tighter profile and by not allowing such material to spread out, free-fall and accelerate.

Another important aspect of the present system is the fact that sufficient volume is designed into the enclosure structure to allow for recirculation of the induced air flow so as to keep both the air and the dust particles internal to the material handling transfer system for the reasons hereinafter explained. Typically, in a common transfer chute design, there is no space within the chute and the surrounding enclosure for free air recirculation. On the other hand, in the present system, the volume formed by the enclosure including the transfer chute is sufficiently large to allow free air recirculation from the material loading area of the second conveyor belt system all the way back to the material entry point associated with the first conveyor belt system. This additional recirculation volume substantially prevents the induced air flow from pressurizing the containment enclosure in the area of the loading zone of the second conveyor belt system, which pressurization thereby causes the fugitive dust to blow out and escape into the surrounding environment through any leakage area associated with the enclosure structure. Instead, the present system relieves pressure generated by the induced air flow in the loading zone of the second conveyor belt system and the increase concentration of dust particles inside the recirculation volume of the containment enclosure causes increased collision between the dust particles thereby causing such particles to more readily agglomerate, become heavier than air, and fall back onto either the chute structure or the second conveyor belt system for movement and transfer with the material. This constant recirculation of air and on going agglomeration of dust particles substantially controls and prevents fugitive dust emissions from escaping outside of the present containment enclosure without using an active dust collection system.

Still another important aspect of the present invention is the use of a stilling zone downstream from the loading of the material onto the second conveyor belt system. This stilling zone includes a plurality of spaced curtains positioned adjacent the terminal end portion of the containment enclosure along an intermediate portion of the second conveyor belt system, the plurality of spaced curtains being preferably positioned in a staggered arrangement so as to substantially slow down air movement through this portion of the containment enclosure. The curtains impede air flow through this portion of the enclosure and allow the dust particles to further agglomerate and fall back onto the second conveyor belt system with the rest of the transported material. The stilling zone also absorbs any air pressure surges associated with the entire containment enclosure and substantially prevents any fugitive dust emissions from exiting the stilling zone with the transported material. The length of the stilling zone as well as the spacing and arrangement of the plurality of curtains associated therewith will vary depending upon the particular application involved.

The present material handling transfer system is referred to as a passive control system in that no active means such as power operated suppression systems, fans, filters, and other such means are utilized. Instead, the present system utilizes no power consumption, no moving parts and no filter media other than the stilling zone curtains for containing and controlling fugitive dust emissions within the present containment enclosure system. This provides for a clean, safe environment for both personnel and equipment outside of the containment enclosure. In this regard, the effectiveness of the present system is likewise dependent upon effectively sealing the entire containment enclosure through which the bulk material flows including the transfer chute area and the loading zone area where the transported material is received onto the second conveyor belt system.

The present material handling transfer system therefore eliminates many of the known problems associated with known active and passive systems for controlling fugitive dust emissions and provides for a much more cost effective and less complicated system for achieving a safe work environment in areas where fugitive dust emissions must be controlled and contained. The present dust containment system can be utilized and incorporated into a wide variety of different material handling transfer operations including in-line transfer operations as well as 90° or any other angular transfer operation, regardless of the type of bulk material being transported from one elevated transfer location to a second lower transfer location.

These and other advantages of the present invention will become apparent to those skilled in the art after considering the following detailed specification in conjunction with the accompany drawings.

BRIEF DESCRIPTION OF THE DRAWINGS

For a better understanding of the present invention, reference may be made to the accompanying drawings in which:

FIGS. 5 and 6 are partial side and front elevational views respectively showing another embodiment of a transfer chute and deflector means constructed in accordance with the teachings of the present invention;

DESCRIPTION OF THE PREFERRED EMBODIMENT OF THE INVENTION

Figure 1:
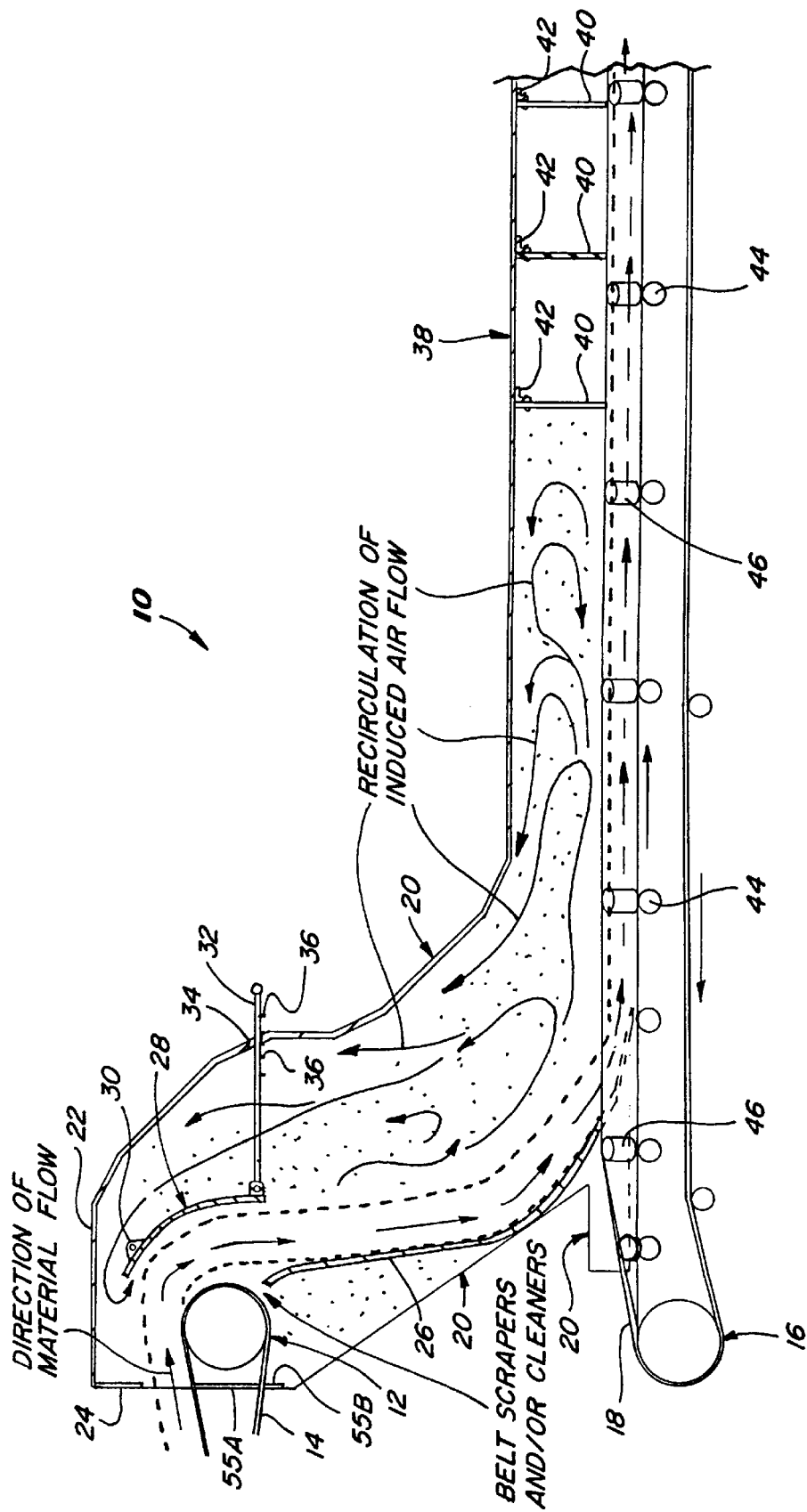
FIG. 1 is a partial cross-sectional side elevational view of one embodiment of the present material handling transfer system constructed in accordance with the teachings of the present invention.

Referring to the drawings more particularly by reference numbers wherein like numerals refer to like parts, number 10 in FIG. 1 refers to one embodiment of the present material handling transfer system, the present system or assembly 10 shown in FIG. 1 being adaptable for use in a belt-to-belt transfer operation wherein bulk material such as coal is transferred from a first elevated conveyor belt system 12 to a second lower belt conveyor system 16. The first conveyor system 12 includes a moving belt member 14 which moves the bulk material from a first elevated location into the present material handling transfer system 10 for deliver onto the moving belt member 18 associated with the second lower conveyor belt system 16. The conveyor systems 12 and 16 are of conventional construction and are supported in their respective operative positions in a conventional manner such will be hereinafter further explained with respect to FIGS. 3 and 4. The parallel dashed lines and arrows illustrated in FIG. 1 identify the direction of flow and the specific path taken by the bulk material as it moves through the present system 10 from the first conveyor belt system 12 to the second conveyor belt system 16.

The conveyor systems 12 and 16 are vertically separated as shown in FIG. 1 and the specific application illustrated in FIGS. 1–4 represents an in-line transfer arrangement, that is, conveyor systems 12 and 16 are in substantial alignment with each other. Although the present transfer system 10 will be described with reference to an in-line belt-to-belt transfer operation, it is likewise equally adaptable to situations where the belt systems 12 and 16 are angularly oriented to each other as will be hereinafter explained with reference to FIGS. 5 and 6. Still further, as will become apparent to those skilled in the art after considering the construction and operation of the present system 10 as will be hereinafter explained with respect to FIGS. 1–6, the present transfer containment system 10 is likewise equally adaptable for use in a belt-to-bin transfer application as well as in bin-to-belt and crusher-to-belt transfer applications.

The present transfer system 10 includes an enclosure 20 which completely encases the transfer location between the first conveyor belt system 12 and the second conveyor belt system 16. More particularly, the containment enclosure 20 includes a hood portion 22 which extends over the end or termination portion of the first conveyor system 12 as shown in FIG. 1 so as to completely enclose the ingress area where the bulk material departs the belt 14 en route to the belt 18. The hood portion 22 will extend over a portion of the first conveyor belt system 12 a sufficient distance to ensure that all dust particles generated by the bulk material within the present containment system 10 will remain within the enclosure 20 and will not propagate back into the work area adjacent the ingress area. In this regard, the entry zone of the hood enclosure portion 22 will typically include at least one flexible curtain 24 which will substantially cover the ingress zone into the present containment system 10. The at least one curtain 24 will substantially prevent the backflow of dust particles within the containment system 10 from re-entering the work environment adjacent the entry location. How far the hood portion 22 will extend along the conveyor belt system 12 will vary depending upon the particular application involved including the type of bulk material being transferred, the width of the conveyor belt, the rate of flow of the material along the conveyor system, the size of the material being transferred, and the amount of fugitive dust being generated by the stream of falling material from conveyor system 12 to conveyor system 16. The same parameters will likewise be taken into account in order to determine the length of the containment enclosure 20 adjacent the second conveyor belt system 16.

Figure 2:
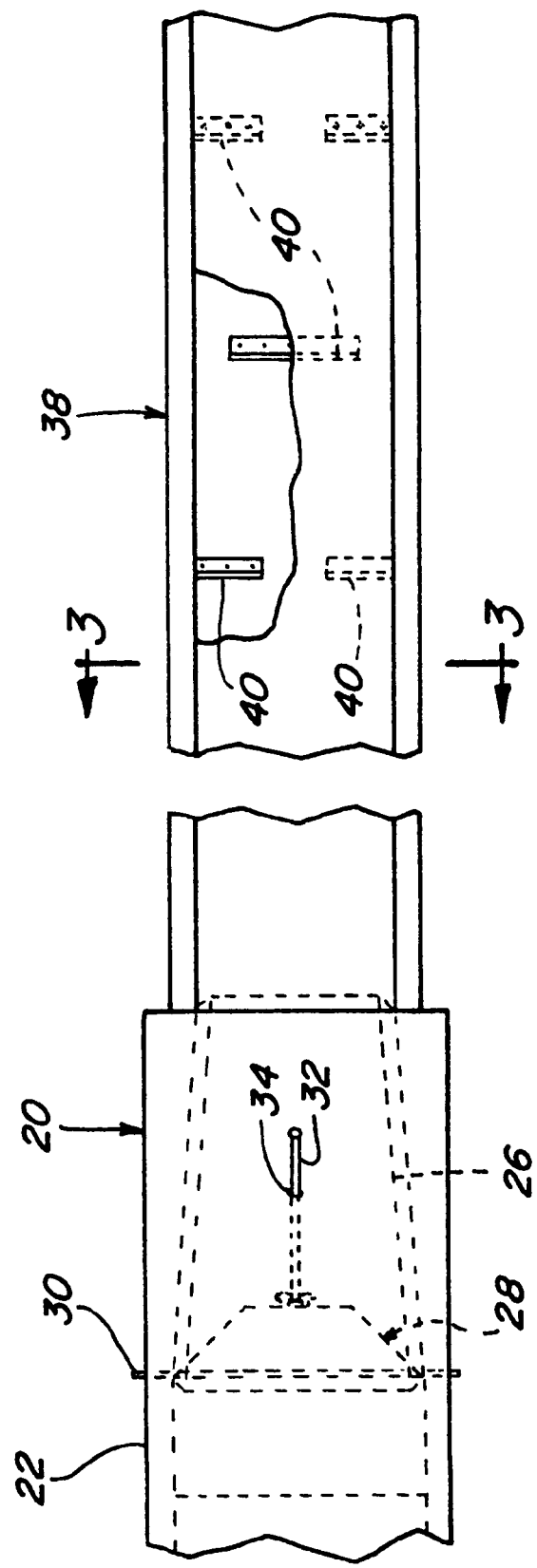
FIG. 2 is a fragmentary top plan view of the present material handling transfer system showing the stilling zone associated therewith.
Figure 3:
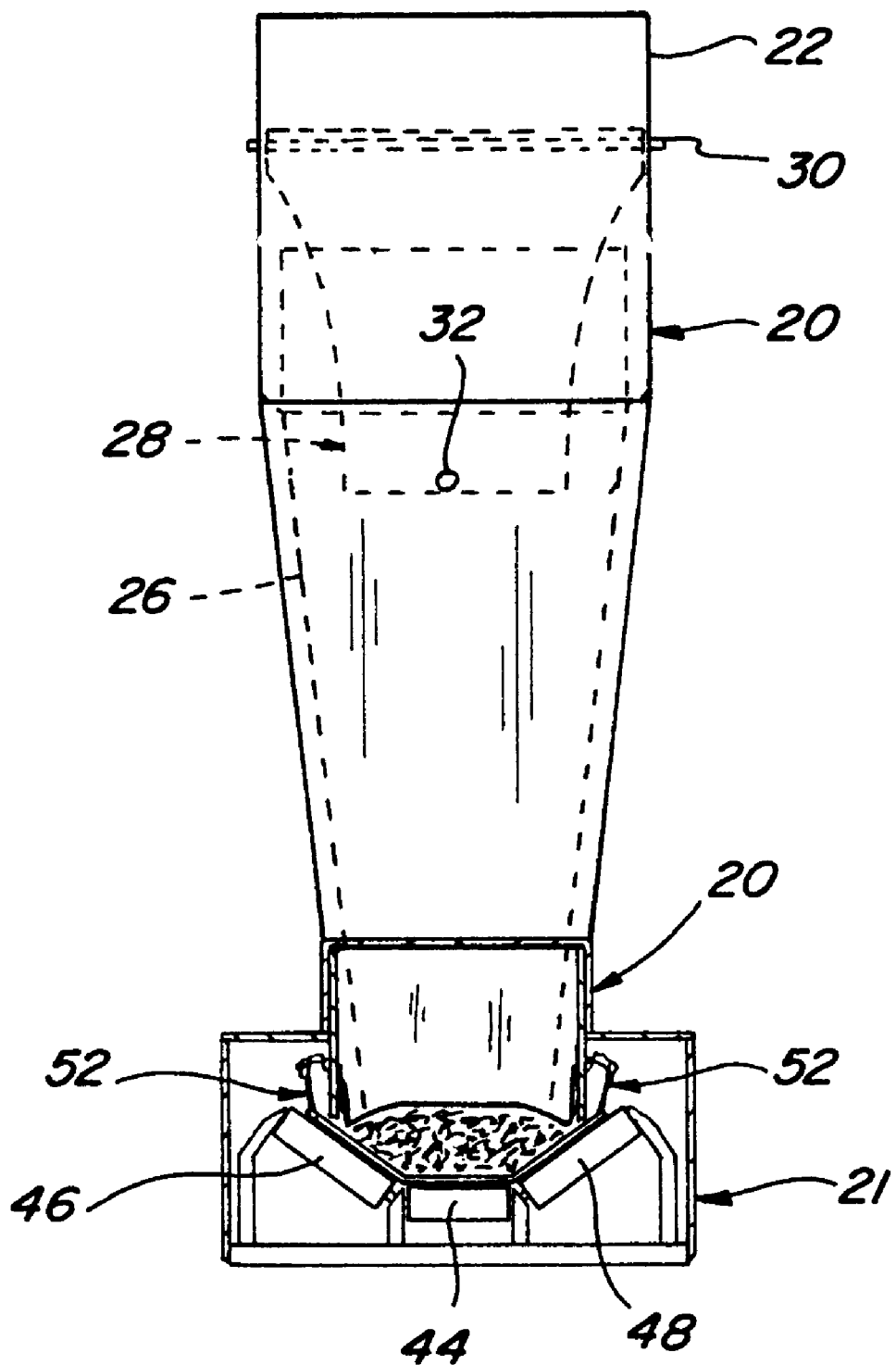
FIG. 3 is a cross-sectional view taken along line 3—3 of FIG. 2.

The present system 10 also includes a transfer chute member 26 as shown in FIGS. 1–3 which is positioned and located so as to transport the bulk material from adjacent the first conveyor belt system 12 at the ingress location onto the second conveyor belt system 16. One end portion of the chute member 26 is positioned adjacent the termination end of the first elevated conveyor system 12 (FIG. 1) and its opposite end portion is positioned adjacent the belt member 18 associated with the second conveyor system 16 at an intermediate location therealong. The chute member 26 may take on a wide variety of shapes so long as its overall configuration is sufficient to contain the bulk material as it moves therealong. Typically, the cross-sectional shape of the chute 26 will be somewhat U-shaped in configuration, or some variation thereof, as best shown in the particular chute embodiment illustrated in FIG. 5. For example, in the particular chute construction illustrated in FIG. 5, the side walls of the chute 56 are positioned at approximately a 45° angle to the central floor portion of the chute. Although the particular cross-sectional shape of the chute may vary depending upon the particular application involved, the chute 26 illustrated in FIG. 1 is specifically designed so as to eliminate the direct impact of the falling material stream onto the belt 18 of the second conveyor system 16.

Referring more particularly to FIG. 1, chute 26 is configured so as to maximize the flow of material as such material moves down the chute and to more substantially align the trajectory of the moving material at the end of the chute 26 with the direction of movement of the belt member 18. It is also possible to configure the chute 26 such that the speed of the material exiting the termination end of the chute will be substantially co-equal with the speed of the belt member 18. In other words, the chute 26 vectors the moving material onto the second conveyor system 16 in substantially the same direction of movement of the belt member 18 and at substantially the same speed. Depending upon the particular type and size of bulk material being transferred, the change in elevation between the first conveyor system 12 and the second conveyor system 16, and the rate of movement of such material down the chute member 26, the angle of inclination of the chute member 26 at the point of impact with the second conveyor system 16 will vary.

Nevertheless, regardless of the particular transfer application involved, the present chute member 26 is curved and configured so as to lay the flowing stream of material onto the second conveyor belt 18 at an acute angle to such belt which is substantially less than the angle of impact generated if the bulk material is allowed to free-fall directly onto the second conveyor system 16. The present chute design therefore substantially reduces dust generation due to the impact of the moving material onto the second conveyor belt system 16 thereby substantially eliminating the "trampoline" effect that pumps dust into the air when the stream of material suddenly impacts the belt member 18. The design of the present transfer chute 26 therefore considerably improves material loading onto the lower belt member 18; it reduces direct impact of the bulk material onto the belt member 18 and the generation of fugitive dust as a result of the above-discussed "trampoline" action; it reduces belt wear and increases belt life; and it provides ventilation space between the falling material and the containment enclosure 20 as will be hereinafter discussed.

In an effort to further control movement of the bulk material from conveyor system 12 to conveyor system 16 and, importantly, to substantially eliminate any free-fall of the bulk material during the transfer operation, the present system 10 also includes adjustable deflector means such as the deflector member 28 illustrated in FIGS. 1–3. The deflector member 28 is positioned and located in the vicinity of the material ingress into the present containment system 10 adjacent the first elevated conveyor belt system 12 as best illustrated in FIG. 1. The specific shape and configuration of the deflector member 28 should be such that it will deflect and funnel the stream of moving material as it comes off of the first conveyor system 12 onto the chute member 26. This shape may comprise a curved wall type structure as illustrated in FIG. 1, or such shape may take on more of a clam shell type structure such as the deflector means 58 illustrated in FIG. 5. Regardless of the specific shape of the deflector means 28, the primary objective of such member is to contain the stream of moving and falling material as it comes off of the first conveyor belt system 12 and to re-direct such stream of moving material onto the transfer chute 26 as quickly and as smoothly as possible so as to avoid a stream of free-falling material and the dust generated when such free-falling material directly impacts either the chute structure 26 or the belt member 18.

In the particular embodiment illustrated in FIGS. 1–3, the deflector member 28 is shaped so as to quickly and smoothly direct the stream of moving material onto chute 26, the deflector 28 being pivotally attached to a rod member 30 so as to be pivotally moveable thereabout as shown in FIGS. 1–3. Depending upon the speed and trajectory of the material coming off of the first conveyor belt system 12, deflector member 28 can be pivotally adjusted so as to more efficiently capture and funnel such material onto the transfer chute 26. This adjustment can be accomplished by moving the arm member 32 which is attached to the lower end portion of deflector member 28 fore or aft through a sealed opening 34 in enclosure 20 so as to change the position of the deflector member 28 relative to the conveyor system 12. The deflector member 28 can therefore be adjusted and positioned so as to contain the material stream in a tight pattern or profile thereby minimizing the introduction of induced air into the material stream which would occur if such material were allowed to spread out, free-fall and accelerate as it moves towards the second conveyor belt system 16. The rod member 32 may include a plurality of spaced flange portions 36 which are positioned and located so as to engage the enclosure 20 in the vicinity of the opening 34 so as to hold the rod member 32 in engagement therewith at any particular intermediate location along its length once adjustment of the deflector member 28 is accomplished. Alternatively, the rod member 32 may include a plurality of holes or openings (not shown) through which a pin member may be inserted to likewise hold the rod member 32 at any particular intermediate location along its length. It is also recognized and anticipated that any other suitable means for holding the deflector member 28 at a particular orientation relative to the stream of material entering the present transfer system 10 can likewise be utilized to accomplish this task.

In a conventionally designed transfer control containment system, there is typically insufficient space within such enclosure to allow for free air recirculation. As a result, the induced air flow generated from the stream of free-falling material tends to pressurize the containment enclosure in the area where the bulk material makes contact with and transfers to the second conveyor system such that the fugitive dust generated by the material flow impact onto the second conveyor system is forced out under pressure through any leakage areas associated with the enclosure structure. In an effort to overcome this situation, the volume associated with the containment enclosure 20 of the present system 10 takes into account the design of the conveyor systems associated with the transfer operation including the belt width and speed, the size of the material being transported by such conveyor systems, the rate of material flow through the transfer containment area as well as other factors such that sufficient volume is designed into the enclosure 20 to allow for recirculation of the induced air flow generated therewithin. As illustrated in FIG. 1, the volume formed by the present enclosure 20 is sufficiently large to allow free air recirculation from the material impact area onto belt 18 all the way back to the material ingress or entry point adjacent the first conveyor belt system 12 in the hood area 22 of the enclosure 20. This increased volume is particularly noticeable in the area adjacent to the transfer chute 26 and in the area immediately down stream from the material loading zone or impact area associated with the second conveyor belt system 16. This increased volume helps to relieve the pressure generated by the induced air flow in the area of the material loading zone or impact area and it also provides sufficient space for recirculation of this induced air flow.

In addition, this increased volume likewise increases the concentration of fugitive dust particles inside the recirculation volume of the present containment enclosure 20 as best illustrated in FIG. 1, which increased concentration facilitates increased collision between the respective dust particles thereby causing such particles to more readily agglomerate. As more fugitive dust particles agglomerate, they become heavier than air and fall back onto the transfer chute 26 or the belt member 18 for movement with the rest of the transported material. This capacity to increase and facilitate the agglomeration of dust particles within the containment enclosure 20 substantially controls and prevents fugitive dust emissions from escaping outside of the enclosure 20.

In order to further ensure that fugitive dust emissions will not escape via the exit portion of the present containment system 10, a stilling zone 38 is established within the enclosure 20 downstream from the transfer of the bulk material onto the second conveyor system 16 as best shown in FIGS. 1 and 2. The stilling area 38 includes a plurality of spaced curtains 40 positioned adjacent the terminal end portion of the container enclosure 20 along an intermediate portion of the second conveyor belt system 16. The plurality of spaced curtains 40 are preferably positioned in a staggered arrangement as best shown in FIG. 2 so as to substantially slow down any air movement through this portion of the containment enclosure 20. The curtains 40 impede air flow through the stilling zone 38 and allow any fugitive dust particles which may be carried into this area to further collide and agglomerate so as to again become heavier than air and fall back onto the belt member 18. Although the staggered curtain arrangement illustrated in FIG. 2 may more readily enhance and facilitate the agglomeration of any remaining fugitive dust particles which enter the stilling zone 38, it is recognized and anticipated that any spaced arrangement of the curtains 40 within the stilling area 38 including an unstaggered parallel arrangement will likewise enhance agglomeration and achieve the stated objective.

The overall length of the stilling zone 38 is important to the dust containment function and will depend upon the particular application involved. Depending upon the amount of potential fugitive dust emissions entering the stilling zone 38, a sufficient length should be utilized which will adequately allow for the entrained dust particles to agglomerate and precipitate back to the material flow being transported on belt member 18. In this regard, it is also recognized and anticipated that the spacing between the plurality of curtains 40 may be varied depending upon the particular application involved, and any number of curtains 40 may be utilized in a particular application.

As best shown in FIG. 1, the stilling zone 38 also substantially absorbs any air pressure surges generated within the containment enclosure 20 due to the movement of the bulk material therein and, particularly, due to the impact of such material onto the belt member 18. Here again, the plurality of curtains 40 absorb such surges and substantially prevent any fugitive dust emissions from exiting the stilling zone 38 with the transported material. The curtains 40 may be attached to the walls of the enclosure 20 by any suitable means such as through the use of the brackets 42 illustrated in FIG. 1.

Figure 4:
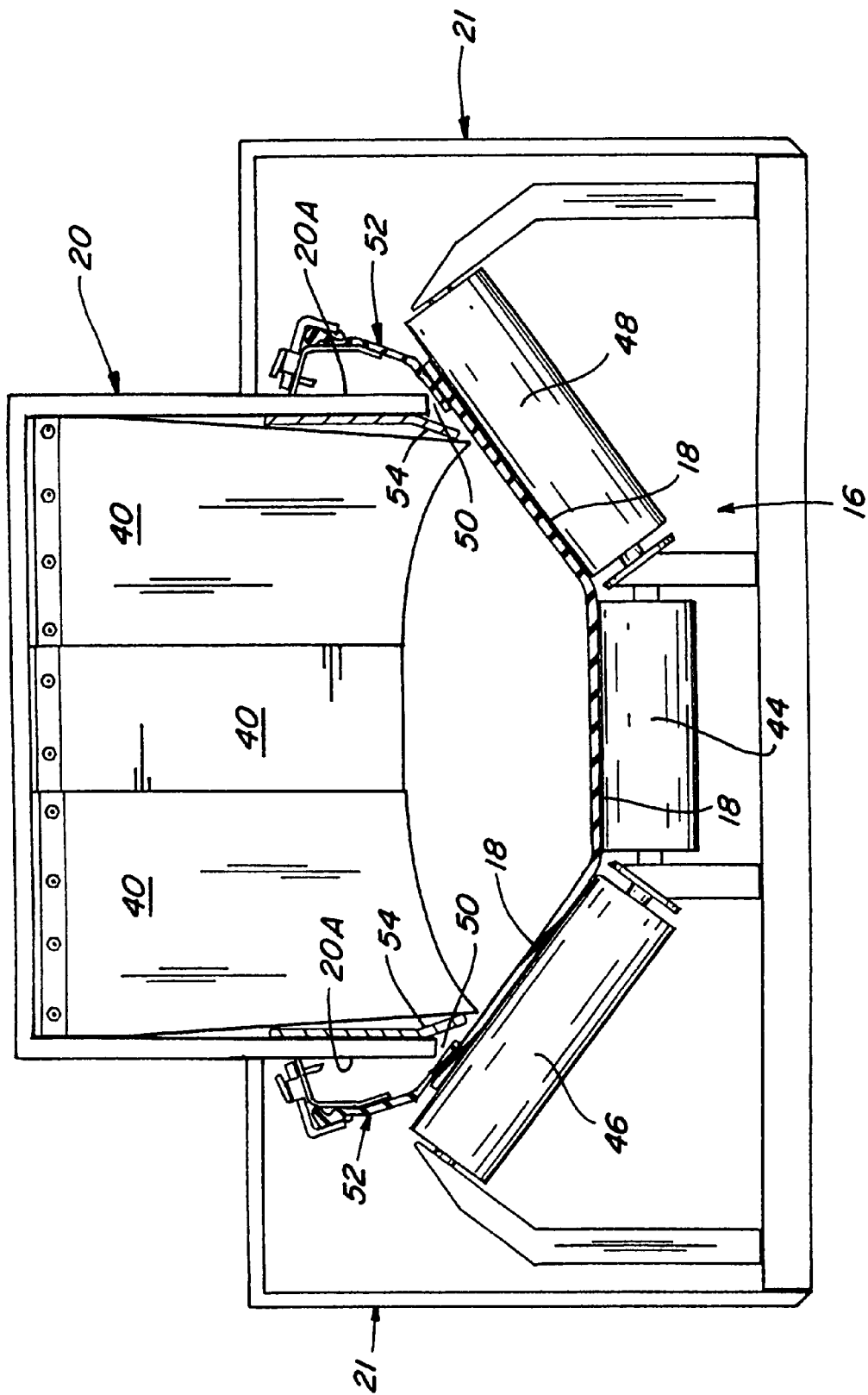
FIG. 4 is an end view of the present material handling transfer system taken at the exit portion of the stilling zone.

FIGS. 3 and 4 illustrate the particular construction of the conveyor belt system 16 and the containment enclosure 20 which encases the conveyor system 16 along a portion of its length. Both conveyor systems 12 and 16 are of conventional construction and, as best illustrated in FIGS. 3 and 4, conveyor system 16 includes a substantially stationary central portion 44 and two angularly moveable side portions 46 and 48. The conveyor side portions 46 and 48 are each respectively attached and/or connected to the conveyor central portion 44 by conventional means so as to be angularly moveable relative to the central portion 44. As such, the cradle containment channel formed by the conveyor portions 44, 46 and 48 can be adjusted and varied depending upon the type, size and rate of flow of the bulk material being transported by the conveyor system. The conveyor system 16 is supported upon the bottom surface of the enclosure 20 as best shown in FIGS. 3 and 4 in a conventional manner and the belt member 18 extends and moves across the upper surface of all three conveyor portions 44, 46 and 48 in a conventional manner.

The efficiency and effectiveness of the present transfer containment system 10 is likewise dependent upon effectively sealing the entire containment enclosure from ingress of the bulk material into the present system 10 via conveyor system 12 through exit of such material through the stilling zone 38. As best illustrated in FIGS. 1 and 4, the shape and dimensions of the enclosure 20 will be such so as to completely encase the conveyor systems 12 and 16, the transfer chute 26, and any other system components contained within the enclosure 20. In this regard, as best shown in FIG. 1, the enclosure 20 also extends from the hood portion 22 along the back side of the chute member 26 and is sealed around the belt member 18 of conveyor system 16 as will be hereinafter further explained as to contain all dust emissions therewithin.

In similar fashion, it is also important to effectively seal the enclosure 20 around the upper belt portion of the conveyor system 16, particularly in the area where the bulk material first impacts the belt member 18, so as to again contain and control any fugitive and respirable dust emissions generated in the loading zone area of conveyor system 16. This is accomplished by having the opposed enclosure wall portions 20A extend downwardly to a position adjacent the belt member 18 on each opposite side of the conveyor system 16 as best shown in FIG. 4. This arrangement helps to contain any dust emissions from the moving material in an area directly above the belt member 18. The gap or space 50 formed between the terminal end portion of the respective enclosure wall portions 20A and belt member 18 is sealed through the use of a plurality of sealing clamps 52 which are positioned and located so as to engage the opposed end portions of the belt member 18 as best shown in FIG. 4. A liner member 54 may also be attached to the inside portion of the respective enclosure side walls 20A so as to extend beyond the respective terminal end portions thereof (FIG. 4) to provide a further mechanism for sealing the gap 50 and containing any dust emissions within the enclosure 20 in the area above the conveyor system 16. The enclosure sidewall portions 20A, the sealing clamps 52, and the liner member 54 effectively seal the enclosure 20 in the area immediately above the conveyor system 16 and substantially prevent any fugitive and respirable dust emissions from escaping through the space or gap 50, or any other leakage areas. This sealing and containment arrangement likewise keeps any fugitive and respirable dust emissions in that portion of the enclosure 20 which is conducive to recirculation of the induced air flow back to the ingress location and/or containment within the stilling zone 38. Although the members 20A, 52 and 54 illustrate one mechanism for effectively sealing the enclosure 20 around the conveyor system 16, it is recognized and anticipated that a wide variety of other sealing methods and means may be utilized to accomplish this task. As best shown in FIG. 4, the enclosure 20 is attached to the conveyor idler support frame 21 in a conventional manner.

It is likewise important to effectively seal the hood portion 22 of enclosure 20 in the area adjacent conveyor system 12. This may be accomplished by positioning and locating seals such as the seals 55A and 55B in the head pulley area of belt 14 as best shown in FIG. 1. In this regard, the seal 55A extends between the spaced top and bottom portions of belt member 14 adjacent the material ingress area into hood portion 22 (FIG. 1) to seal the area therebetween whereas seal 55B extends across the area between the bottom of the lower belt portion 14 and the lower portion of hood portion 22 to seal that respective area. In addition, the at least one flexible curtain 24 likewise forms a seal with the top portion of hood portion 22 and such curtain substantially seals the ingress zone to the enclosure 20 as previously explained. Still further, belt scrapers and/or cleaners are typically located in the area adjacent the pulley area of belt 14 and the leading edge of the chute member 26 as indicated in FIG. 1 so as to dislodge and direct any material still remaining on the belt 14 unto the chute member 26 thereby further preventing any material and/or associated dust from exiting the containment area. Other sealing arrangements and configurations for effectively sealing the material ingress area of the present containment system are likewise recognized and anticipated.

FIGS. 5 and 6 illustrate another embodiment of a transfer chute and deflector means constructed in accordance with the teachings of the present invention. The transfer chute 56 illustrated in FIGS. 5 and 6 is a 90° transfer chute specifically designed for transferring bulk material from a first elevated conveyor system 12 to a second lower conveyor system 16 where such conveyor systems are oriented at substantially 90° relative to each other. In all other respects, the construction and operation of the conveyor systems 12 and 16 are as previously explained. Similarly, transfer chute 56 is substantially identical to the construction and operation of transfer chute 26 except that chute 56 is constructed so as to achieve a 90° turn from the initial ingress of the bulk material via conveyor system 12 to the termination point of transfer chute 56 where such material is guided onto the second conveyor system 16. In all other respects, like chute member 26, the transfer chute 56 is similarly designed to contain the bulk material as it moves and flows through the chute 56 and to substantially align the trajectory of the moving material at the end of chute 56 with the direction and speed of movement of the conveyor belt system 16. As best shown in FIG. 5, the transfer chute 56, like transfer chute 26, is cradle-like or channel shaped in configuration, the specific depth and shape of the chutes 56 and 26 being determined by various parameters associated with the particular transfer application such as the type, size and shape of the bulk material being transferred, the conveyor belt width and speed, and the rate of movement of the material both along conveyor system 12 and down the particular transfer chute 56 or 26.

FIGS. 5 and 6 also disclose another embodiment 58 of the present deflector means wherein the deflector member 58 is more clam shell like and tapered in shape for guiding and funneling the bulk material onto the transfer chute 56. Like transfer chute 26, chute 56 is likewise pivotally attached to the rod member 30 so as to be adjustable depending upon the speed and trajectory of the material coming off of the conveyor belt system 12. Adjusting the angular orientation of the deflector member 58 is accomplished through the use of an adjusting assembly 60 illustrated in FIG. 5. The adjusting mechanism 60 may be similar in construction to the adjusting mechanism 32 previously described and illustrated in the FIG. 1, or the adjusting mechanism 60 may comprise other suitable constructions for accomplishing this task. For example, the adjusting mechanism 60 may include a threaded rod or member 62 attached to the deflector 58 such that the rod 62 may be threadedly engaged with an opening extending through the enclosure 20 for positioning the deflector 58 at the desired location. Still further, the adjusting mechanism 60 may likewise include a slot, bracket and arm member arrangement (not shown) wherein the arm member includes a plurality of apertures (not shown) extending therethrough engageable with the bracket member to hold the arm member at any one of a plurality of selected locations along the length of such arm member. Other adjusting mechanisms are likewise anticipated and contemplated for accomplishing this task. In all other respects, the operation and function of the deflector 58 is substantially similar to the operation and function of deflector 28.

It is also recognized and anticipated that the present transfer enclosure system including the containment enclosure 20, the transfer chutes 26 and 56, the stilling zone 38, and the conveyor belt systems 12 and 16 are supported within the present system 10 in a conventional manner using appropriate support structure for adequately supporting and carrying the load generated by the stream of moving material as it is transferred from conveyor system 12 via the present transfer chute structure 26 or 56 to the lower conveyor system 16 and through the stilling zone 38. In similar fashion, the conveyor systems 12 and 16 are likewise supported and constructed in a conventional manner as previously explained including using some type of reinforcing structure for the belt member 18 in the impact area where the stream of bulk material is transferred to the second conveyor belt system 16. This additional belt support structure at the impact area will help to alleviate the forces and stresses applied to the belt member 18 due to the impact of the bulk material in the loading zone; it will help stabilize the conveyor belt transfer points to prevent spillage of material and damage to conveyor components; it will save wear and tear on the overall belt member 18; and it will increase the overall longevity of the belt member 18. Other supporting structures and systems as well as other sealing mechanisms and other non-active dust collection components may likewise be utilized with the present system 10.

The present material handling transfer system 10 therefore utilizes various passive dust control mechanisms including a specially designed transfer chute structure, deflector means for containing and funneling the bulk material onto the transfer chute, a specially designed containment enclosure which promotes recirculation of induced air flow within the enclosure, and a stilling zone to control fugitive dust generation in a bulk material handling transfer operation. Although a passive material handling transfer system for controlling and reducing fugitive dust emissions may never be completely free of visible dust emissions, the present system as described herein, when properly sealed, will contain 98% to 99% of the total dust emissions generated within the containment enclosure. In fact, based upon current testing of the present dust control system, the present system is at least four (4) times cleaner and more effective in controlling and containing fugitive dust emissions as compared to the known baghouse system. Also, importantly, the present system 10 has been recognized by the Department of Environmental Quality for the State of Wyoming as achieving the Best Available Control Technology for fugitive dust control systems.

Figure 7:
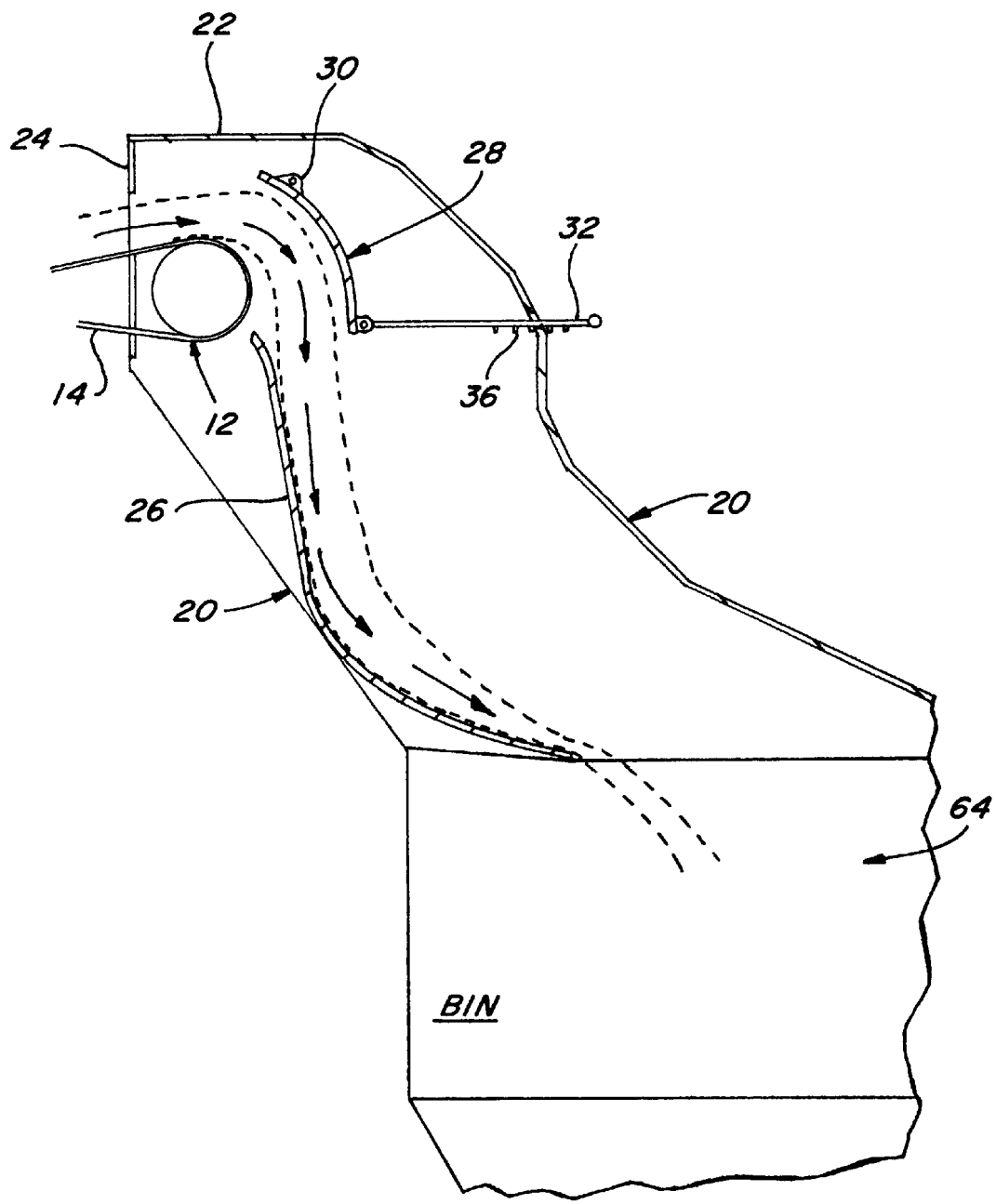
FIGS. 7 and 8 are partial side views showing the transfer chute in use with a storage bin and a receiving bin.
Figure 8:
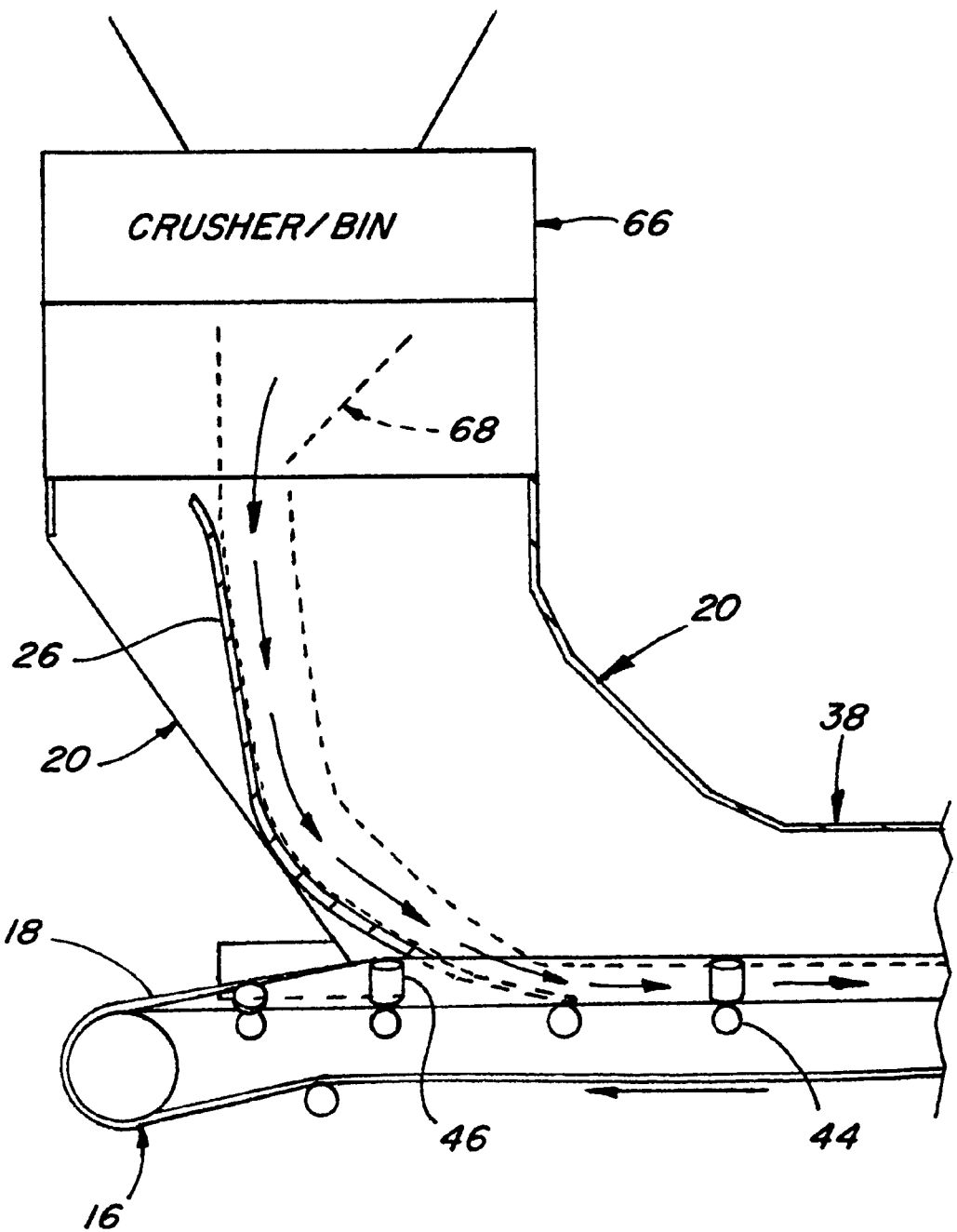

In addition, depending upon the particular transfer application involved, it is likewise recognized and anticipated that use of the stilling zone 38 may not be necessary. For example, in a belt-to-bin transfer application as shown in FIG. 7, the terminal end portion of the transfer chute 26 may extend directly into the bin area 64 thereby obviating the need for the stilling zone. Other combinations and variations of the various passive techniques disclosed and described herein may likewise be utilized to achieve the stated objectives depending upon the particular application and the amount of fugitive and respirable dust emissions generated in a particular transfer operation. For example, in a bin-to-belt transfer application as shown in FIG. 8, the transfer of the material out of the bin or other material storage area 66 is typically accomplished through a gate or other valve type device which meters the flow of material unto either a belt or chute structure which will then direct the material flow through deflector means 68 and then unto the transfer chute 26 or 56 of the present system. In the case of a crusher-to-belt transfer application as likewise shown in FIG. 8, the material typically exits the crusher 66 via a hole or throat area located at the bottom of the crusher, which material is then fed into and through a four-sided funnel type structure which serves as a deflector such as the deflector 68 in FIG. 8 for ingress into the present enclosure system and unto the transfer chute 26 or 56. 28 or 58. Other mechanisms for both ingressing and egressing the material flow into and out of the present system are likewise possible.

As is evident from the foregoing description, certain aspects of the present invention are not limited to the particular details of the examples illustrated herein, and it is therefore contemplated that other modifications, variations, and other uses and applications of the present invention will become apparent to those skilled in the art after considering this specification and the accompanying drawings. All such changes, modifications, variations, and other uses and applications which do not depart from the spirit and scope of the invention are deemed to be covered by the present invention.

Other aspects, objects and advantages of the present invention can be obtained from a study of the drawings, the disclosure and the appended claims.

What is claimed is:

1. A material transfer system for controlling dust emissions generated during a transfer operation for bulk material when material is being moved from a first location to a second location and wherein the first and second locations are spaced from each other, the system comprising, a conveyor system having at least one end portion associated with the first location for moving bulk material which generates fugitive dust emissions to the second location;

a chute member having opposed end portions and being positioned between the first and second locations for receiving the material from the one end portion of the said conveyor system and delivering the material to the second location, one end portion of said chute member being positioned adjacent the first location and the opposed end portion of said chute member being positioned adjacent the second location, said chute member being configured to eliminate direct impact of the material at the second location;

a deflector member spaced from said chute member and positioned in the area adjacent the one end portion of said conveyor system, said deflector member being shaped and dimensioned so as to direct the material from the one end portion of said conveyor system onto to said chute member; and an enclosure member enclosing at least the one end portion of said conveyor system, said chute member, and said deflector member, said enclosure member being further positioned at least adjacent to the second location and having sufficient volume to allow for recirculation of the induced air flow associated with the moving material as such material is moved from said conveyor system to the second location, said enclosure member including increased volume in the area adjacent to said chute member, said deflector member, and in the vicinity where the material is delivered to the second location wherein fugitive dust emissions generated during the transfer of bulk material between first and second locations are substantially contained within the enclosure member.

2. The system defined in claim 1 wherein said deflector member is adjustably moveable relative to the one end portion said conveyor system to direct the material onto said chute member.

3. The system defined in claim 1 wherein the second location is a storage type bin.

4. The system defined in claim 1 wherein said enclosure member extends over at least a portion of the second location, said system further including a stilling zone formed within said enclosure member downstream from the location where the material is delivered to the second location, said stilling zone having means associated therewith for impeding any dust laden air flow through said zone.

5. The system defined in claim 4 wherein the means associated with said stilling zone includes a plurality of curtain members.

6. The system defined in claim 5 wherein said plurality of curtains are positioned in a spaced staggered arrangement within said stilling zone.

7. The system defined in claim 1 including a conveyor system associated with the second location for receiving the material from the conveyor system associated with the first location, said chute member being constructed such that the trajectory of the moving material as it leaves said chute member forms an acute angle with the direction of movement of the conveyor system associated with the second location.

8. The system defined in claim 7 wherein the direction of movement of the conveyor system associated with the first location is angularly oriented with respect to the direction of movement of the conveyor system associated with the second location, said chute member being constructed so as to achieve said angular transfer.

9. A material transfer system for controlling dust emissions generated during a transfer operation when material is being moved from a first location to a second location, the system comprising:

a first conveyor system having at least one end portion associated with the first location for moving the material to the second location a second conveyor system having at least a portion thereof associated with the second location for receiving the material from said first conveyor system, said first conveyor system being spaced from said second conveyor system a chute member having opposed end portions positioned between said first and second conveyor systems for receiving the material from said first conveyor system and delivering such material to said second conveyor system, one end portion of said chute member being positioned adjacent the one end portion of said first conveyor system and the opposite end portion of said chute member being positioned adjacent a portion of said second conveyor system, said chute member being configured to eliminate direct impact of the material unto said second conveyor system and constructed so as to position the opposite end portion thereof at an acute angle with respect to the direction of movement of said second conveyor system so as to substantially align a trajectory of the moving material at the second location with the direction of movement of said second conveyor system;

a deflector member spaced from said chute member and positioned in the area adjacent the one end portion of a said first conveyor system, said deflector member being constructed to direct the material onto said chute member;

an enclosure member enclosing at least the one end portion of said first conveyor system, said chute member, said deflector member, and at least a portion of said second conveyor system, said enclosure having sufficient volume to allow for recirculation of the induced air flow associated with the material as such material is moved from the first conveyor system to the second conveyor system; and a stilling zone formed within said enclosure downstream from the location where the material is received onto said second conveyor system, said stilling zone extending over at least a portion of said second conveyor system and having means associated therewith for impeding any dust laden air flow through said zone.

10. The system defined in claim 9 wherein said chute member is constructed such that the speed of the moving material as it leaves the one end portion of said chute member located adjacent to said second conveyor system is substantially equal to the speed of said second conveyor system.

11. The system defined in claim 9 wherein the direction of movement of said first conveyor system is in substantial alignment with the direction of movement of said second conveyor system, said chute member being constructed so as to achieve an in-line transfer of the material from said first conveyor system to said second conveyor system.

12. The system defined in claim 9 wherein the direction of movement of said first conveyor system is angularly oriented with respect to the direction of movement of said second conveyor system, said chute member being constructed so as to achieve an angular transfer of the material from said first conveyor system to said second conveyor system.

13. The system defined in claim 12 wherein the direction of movement of said first and second conveyor systems are oriented at substantially 90° relative to each other, said chute member being constructed so as to achieve substantially a 90° turn between its opposed end portions.

14. The system defined in claim 9 wherein said deflector member is substantially clam-shell like in shape.

15. The system defined in claim 9 wherein said deflector member is adjustably moveable relative to the one end portion of said first conveyor system to direct the material onto said chute member.

16. The system defined in claim 9 wherein the volume of said enclosure member is increased in the area adjacent to said chute member, adjacent to said deflector member, and adjacent to where the material is received onto said second conveyor system.

17. The system defined in claim 9 wherein the volume of said enclosure member is sufficiently large to enable air recirculation from the location where the material is received onto said second conveyor system back to the one end portion of said first conveyor system.

18. The system defined in claim 9 wherein the means associated with said stilling zone for impeding any dust laden air flow through said zone includes a plurality of spaced curtain members.

19. The system defined in claim 18 wherein said plurality of spaced curtain members are positioned in staggered arrangement within said zone.

20. The system defined in claim 9 including sealing means for containing the dust emissions within said enclosure.

21. A material transfer system for controlling dust emissions generated during transfer operation when material is being moved from a first location to a second location, the first and second locations being spaced from each other, the system comprising:

- a conveyor system having at least a portion thereof associated with the second location for receiving the material from the first location;
- a chute member having opposed end portions positioned between the first and second locations for receiving the material from the first location and delivering the material to the conveyor system associated with the second location, a first end portion of said chute member being positioned adjacent the first location and a second end portion of said chute member being positioned adjacent a portion of said conveyor system, said chute member being cradle-like in shape and having one end portion thereof positioned such that the trajectory of the material leaving said chute member forms an acute angle with the direction of movement of said conveyor system so as to eliminate direct impact of the material unto said conveyor system;
- a deflector member positioned in the area adjacent the first location, said deflector member being constructed to direct the material onto said chute member;
- an enclosure positioned adjacent the first location and enclosing said chute member, said deflector member, and at least a portion of said conveyor system, said enclosure having sufficient volume to allow for recirculation of induced air flow associated with the material as the material is moved from the first location to said conveyor system; and
- a stilling zone formed within said enclosure downstream from the location where the material is received onto said conveyor system, said stilling zone extending over at least a portion of said conveyor system and having means associated therewith for impeding any dust laden air flow through said zone.

22. The system defined in claim 21 wherein said chute member is constructed so as to substantially align the trajectory of the moving material at the one end portion of said chute member with the direction of movement of said conveyor system.

23. The system defined in claim 21 wherein the direction of movement of said conveyor system is angular oriented relative to the direction of movement of the material as such material leaves the first location, said chute member being constructed so as to achieve said annular transfer.

24. The system defined in claim 21 wherein said deflector member is adjustably moveable to direct the material as it leaves the first location onto said chute member.

25. The system defined in claim 21 wherein the means associated with said stilling zone includes a plurality of spaced curtain members.

26. The system defined in claim 25 wherein said plurality of spaced curtain members are positioned in staggered arrangement within said zone.

27. The system defined in claim 21 including sealing means for containing the dust emissions within said enclosure.

28. The system defined in claim 21 wherein the first location is a storage type bin.

29. The system defined in claim 21 wherein the first location includes a material crusher.

* * * * *

UNITED STATES PATENT AND TRADEMARK OFFICE
CERTIFICATE OF CORRECTION

PATENT NO.   : 6,135,171
DATED        : October 24, 2000
INVENTOR(S)  : Weakly et al It is certified that errors appear in the above-identified patent and that said Letters Patent are hereby corrected as shown below:

In the DESCRIPTION OF THE PREFERRED EMBODIMENT OF THE INVENTION:
Col. 7, line 13, after "application" insert -- (Fig. 7) --.
Col. 7, line 14, after "applications" and before the period insert -- (Fig. 8) --.
Col. 14, line 21, after "56." delete "28 or 58."

In the claims:
Claim 23, Col. 18, line 16, delete "angular" and insert --angularly--.
Claim 23, Col. 18, line 19, please delete "annular" and insert – angular--.

Signed and Sealed this

Eighth Day of May, 2001

*Attest:*

NICHOLAS P. GODICI

*Attesting Officer*   *Acting Director of the United States Patent and Trademark Office*